United States Patent
Romano et al.

(10) Patent No.: US 10,895,752 B1
(45) Date of Patent: Jan. 19, 2021

(54) DIFFRACTIVE OPTICAL ELEMENTS (DOES) FOR HIGH TOLERANCE OF STRUCTURED LIGHT

(71) Applicant: Facebook Technologies, LLC, Menlo Park, CA (US)

(72) Inventors: Nitay Romano, Sunnyvale, CA (US); Nadav Grossinger, Foster City, CA (US); Yaakov Yonatan Layosh, Palo Alto, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 405 days.

(21) Appl. No.: 15/867,463

(22) Filed: Jan. 10, 2018

(51) Int. Cl.
*G02B 27/42* (2006.01)
*G02B 5/18* (2006.01)
*G06T 7/521* (2017.01)

(52) U.S. Cl.
CPC ......... *G02B 27/425* (2013.01); *G02B 5/1842* (2013.01); *G02B 5/1866* (2013.01); *G06T 7/521* (2017.01)

(58) Field of Classification Search
CPC ............ G02B 27/0944; G02B 27/4205; G02B 27/4233; G02B 27/425; G02B 27/4266; G02B 27/4272; G02B 27/4277; G02B 27/48; G02B 27/09; G02B 27/42; G02B 5/1842; G02B 5/1866; G03B 35/00
See application file for complete search history.

(56) References Cited

U.S. PATENT DOCUMENTS

| | | | | |
|---|---|---|---|---|
| 5,621,527 | A * | 4/1997 | Kaneda | G01D 5/38 250/237 G |
| 6,072,631 | A * | 6/2000 | Guenther | G02B 5/32 359/565 |
| 7,675,629 | B2 * | 3/2010 | Ohsaki | G02B 27/0025 356/515 |
| 9,686,839 | B1 * | 6/2017 | Chern | H05B 47/10 |
| 9,915,827 | B2 * | 3/2018 | Gordon | H04N 5/332 |
| 2003/0067685 | A1 * | 4/2003 | Niv | G02B 5/32 359/566 |
| 2012/0050713 | A1 * | 3/2012 | Inoue | G01C 3/10 356/3.11 |

(Continued)

*Primary Examiner* — Balram T Parbadia
(74) *Attorney, Agent, or Firm* — Weaver Austin Villeneuve & Sampson LLP

(57) ABSTRACT

Disclosed herein are techniques for structured light pattern generation. A method for generating a one-dimensional structured light pattern in a first direction and with a desired intensity pattern includes generating a plurality of one-dimensional light patterns using a two-dimensional diffractive optical element with different periods in two orthogonal directions, and combining the plurality of one-dimensional light patterns to form the one-dimensional structured light pattern with the desired intensity pattern. Each of the one-dimensional light patterns includes a one-dimensional light pattern in the first direction. The plurality of one-dimensional light patterns is distributed in a second direction different from the first direction. A separation angle between each pair of adjacent one-dimensional light patterns of the plurality of one-dimensional light patterns in the second direction and with respect to the two-dimensional diffractive optical element is less than a threshold value.

22 Claims, 14 Drawing Sheets

(56) References Cited

U.S. PATENT DOCUMENTS

| | | | | |
|---|---|---|---|---|
| 2012/0105855 A1* | 5/2012 | Miyasaka | ............... | G01B 11/25 |
| | | | | 356/445 |
| 2012/0236288 A1* | 9/2012 | Stanley | ............... | G01B 11/2513 |
| | | | | 356/4.01 |
| 2013/0038941 A1* | 2/2013 | Pesach | ................ | G02B 27/0905 |
| | | | | 359/619 |
| 2013/0182327 A1* | 7/2013 | Miyasaka | ............... | G01B 11/25 |
| | | | | 359/572 |
| 2014/0211215 A1* | 7/2014 | Pesach | ............... | G02B 27/1086 |
| | | | | 356/610 |
| 2016/0377414 A1* | 12/2016 | Thuries | ................. | G01B 11/02 |
| | | | | 356/625 |
| 2017/0115497 A1* | 4/2017 | Chen | ....................... | F21V 5/008 |
| 2017/0188016 A1* | 6/2017 | Hudman | .............. | H04N 13/254 |
| 2018/0038685 A1* | 2/2018 | Torri | .................. | G01B 11/2518 |

* cited by examiner

DIFFRACTIVE OPTICAL ELEMENTS (DOES) FOR HIGH TOLERANCE OF STRUCTURED LIGHT

BACKGROUND

Structured lighting is the process of projecting a desired illumination pattern (e.g., spots, stripes, grids, etc.) for applications such as scanning, sensing, gaming, and surface inspection. It is generally desirable to generate the illumination pattern with a known or desired intensity profile, such that the intensity of the returned light may indicate, for example, the characteristics of the surface and/or the relative distance (or depth) of a target object or scene being scanned.

Diffractive optical elements (DOEs) with periodic optical structures may be used to generate the desired illumination pattern. DOEs with arbitrary phase profiles for generating the desired illumination pattern with the desired intensity pattern (or profile) may be fabricated with various mature techniques, such as a semiconductor fabrication process or molding process. However, due to the small feature size of the periodic optical structures for optical diffraction, manufacturing process variations or defects and/or design approximations may cause a relatively large difference between the desired intensity profile and the actual intensity profile of the illumination pattern generated by the fabricated DOE.

SUMMARY

The present disclosure generally relates to systems and methods for generating a structured light pattern with a desired intensity profile. The systems and methods disclosed herein have high tolerance to design and manufacturing inaccuracy, such as manufacturing process variations or defects, and/or design approximations or round-off errors. In one embodiment, a two-dimensional (2-D) DOE with different periods in two orthogonal dimensions may be used to generate an aggregated one-dimensional (1-D) multi-spot pattern with a desired intensity profile. For example, the period in one dimension of the DOE may be much larger than (e.g., more than 100 times or more of) the period of the DOE in the orthogonal dimension. As a result, a plurality of densely packed 1-D multi-spot patterns may be generated by the 2-D DOE. The plurality of densely packed 1-D multi-spot patterns may at least partially overlap with each other at a target plane such that the aggregated light pattern also appears to be a 1-D multi-spot pattern, where each spot of the aggregated 1-D multi-spot pattern may include an array of densely packed small spots arranged in a direction different from the direction of the desired 1-D multi-spot pattern. Thus, the overall beam intensity of each spot of the aggregated 1-D multi-spot pattern at a given area may be the sum (or average) of the beam intensities of the densely packed small spots, and therefore may be less affected by the variation of the intensity of each individual densely packed small spot. As such, the DOE can generate the aggregated 1-D multi-spot pattern with the desired intensity profile while having a higher tolerance for manufacturing process variations or defects and/or design approximations, and thus can be designed and manufactured with a higher yield (and hence a lower cost per device) using existing fabrication techniques.

In some embodiments, a method for generating a one-dimensional structured light pattern in a first direction and with a desired intensity pattern is disclosed. The method may include generating a plurality of one-dimensional light patterns using a two-dimensional diffractive optical element with different periods in two orthogonal directions, and combining the plurality of one-dimensional light patterns to form the one-dimensional structured light pattern with the desired intensity pattern. Each of the one-dimensional light patterns may include a one-dimensional light pattern in the first direction. The plurality of one-dimensional light patterns may be distributed in a second direction different from the first direction. A separation angle between each pair of adjacent one-dimensional light patterns of the plurality of one-dimensional light patterns in the second direction and with respect to the two-dimensional diffractive optical element may be less than a threshold value, such as less than 0.5 degree, less than 0.2 degree, or less than 0.1 degree. In some implementations, each pair of adjacent one-dimensional light patterns of the plurality of one-dimensional light patterns may at least partially overlap in the second direction at a target plane. In some implementations, a period of the two-dimensional diffractive optical element in the second direction is at least 40 times, at least 100 times, at least 150 times, or at least 200 times of a period of the two-dimensional diffractive optical element in the first direction.

In certain embodiments, an optical device for generating a one-dimensional structured light pattern in a first direction and with a desired intensity pattern is disclosed. The optical device may include a two-dimensional diffractive optical element configured to generate a plurality of one-dimensional light patterns. Each of the one-dimensional light patterns may include a one-dimensional light pattern in the first direction. The plurality of one-dimensional light patterns may be distributed in a second direction different from the first direction. A separation angle between each pair of adjacent one-dimensional light patterns of the plurality of one-dimensional light patterns in the second direction and with respect to the two-dimensional diffractive optical element may be less than a threshold value, such as less than 0.5 degree, less than 0.2 degree, or less than 0.1 degree. In some implementations, each pair of adjacent one-dimensional light patterns of the plurality of one-dimensional light patterns may at least partially overlap in the second direction at a target plane. In some implementations, a period of the two-dimensional diffractive optical element in the second direction is at least 40 times, at least 100 times, at least 150 times, or at least 200 times of a period of the two-dimensional diffractive optical element in the first direction. In various embodiments, the two-dimensional diffractive optical element may have a multilevel or continuous phase profile in each period.

In certain embodiments, an optical device for generating a one-dimensional structured light pattern in a first direction and with a desired intensity pattern is disclosed. The optical device may include a two-dimensional diffractive optical element, where a period of the two-dimensional diffractive optical element in a second direction different from the first direction is configured such that diffraction spots at least partially overlap in the second direction at a target plane. In some implementations, a separation angle of diffraction spots in the second direction with respect to the optical device may be less than 0.5 degree, less than 0.2 degree, or less than 0.1 degree. In some implementations, the period of the two-dimensional diffractive optical element in the second direction may be at least 100 times of a period of the two-dimensional diffractive optical element in the first direction.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

Structured lighting is a method in which a known light pattern is projected onto an object or a scene, and, by measuring the deformed pattern, a vision system can determine depth, movement, etc. The structured light pattern can have various shapes, textures, and periods. Structured lighting techniques can be applied in three-dimensional mapping/sensing, shape measurements, machine/computer vision, etc. For example, a structured light depth sensing system may operate by projecting a one-dimensional or two-dimensional light pattern onto a scene. The depth sensing system may then capture image(s) which may represent the scene as illuminated by the light pattern. The depth sensing system may determine the changes that may have occurred between the original light pattern that is projected onto the scene and the light pattern that appears in the captured image(s). The depth sensing system may then use the changes to determine the depth of surfaces in the scene, for example, using triangulation techniques.

Figure 1:
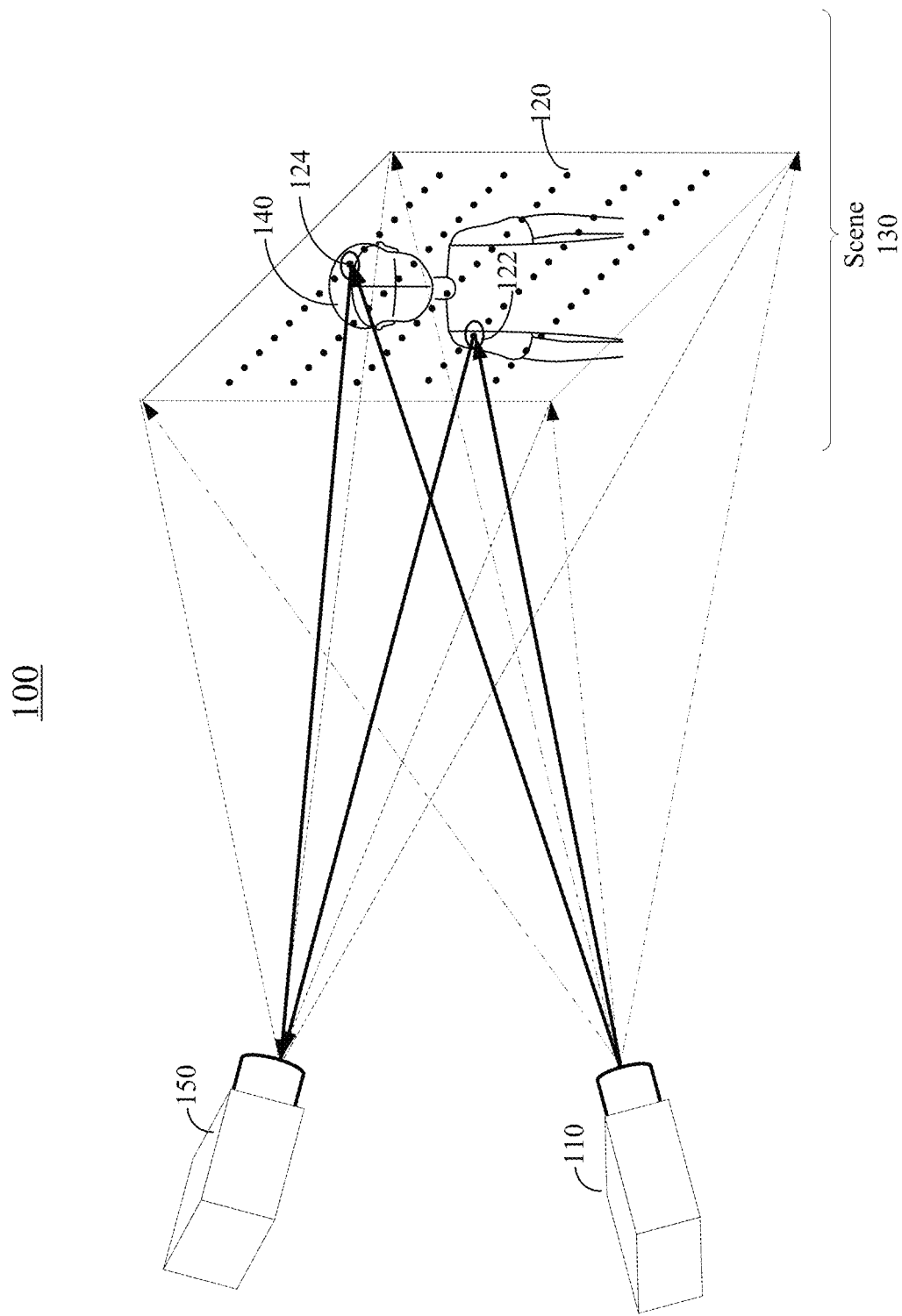
FIG. 1 illustrates an example system for depth sensing using a structured light pattern, according to certain embodiments.

FIG. 1 illustrates an example system 100 for depth sensing using a structured light pattern, according to certain embodiments. System 100 may include a projector 110 and a camera 150. Projector 110 may be used to project a structured light pattern 120 onto a scene 130. Projector 110 may include a monochromatic light source (which may be a coherent light source, such as a laser) and optics for collimating the light beam from the light source and for splitting the collimated light beam into multiple light beams to generate the desired light pattern. Camera 150 may be used to capture images from scene 130. The images may represent scene 130 as illuminated by structured light pattern 120.

System 100 may then analyze the images and the originally projected structured light pattern 120 to construct a depth map. The depth map may represent the depths of surfaces within scene 130.

For example, in the representative example shown in FIG. 1, the depth map may represent the depths of the surface of a subject 140 within scene 130. The depths may be measured with respect to a reference point, such as the source of the projected pattern (i.e., projector 110). In this representative example, light spot 122 in structured light pattern 120 may illuminate a part of the shoulder of subject 140, which may have a shorter distance to the reference point. Light spot 124 in structured light pattern 120 may illuminate a part of the head of subject 140, which may have a longer distance to the reference point. Because the surface of subject 140 is not flat or a spherical surface centered around projector 110, the originally projected structured light pattern may be distorted differently at different light spots by subject 140 in the captured images. The distortion of the projected structured light pattern may then be used to determine the depths of the surface of subject 140.

Figure 2A:
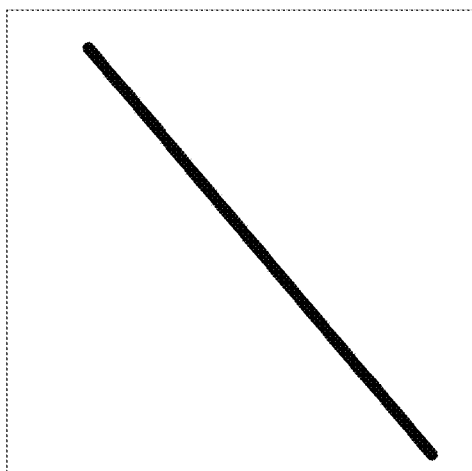
FIG. 2A illustrates an example structured light pattern, according to certain embodiments.
Figure 2B:
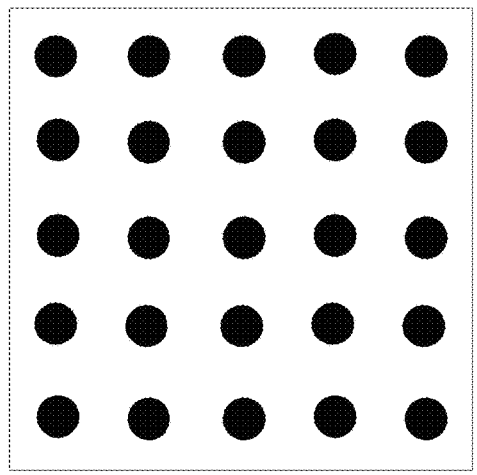
FIG. 2B illustrates an example structured light pattern, according to certain embodiments.
Figure 2C:
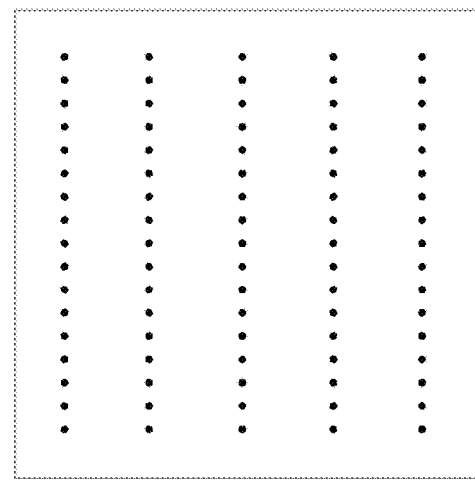
FIG. 2C illustrates an example structured light pattern, according to certain embodiments.
Figure 2D:
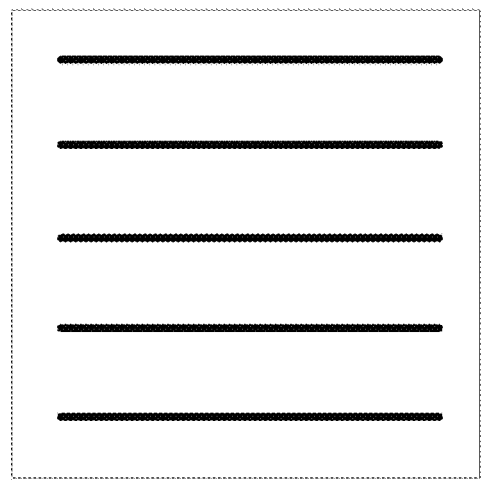
FIG. 2D illustrates an example structured light pattern, according to certain embodiments.
Figure 2E:
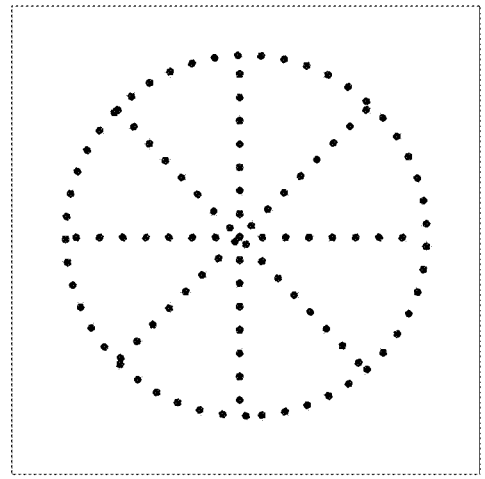
FIG. 2E illustrates an example structured light pattern, according to certain embodiments.

FIGS. 2A-2E illustrate some examples of a structured light pattern, according to certain embodiments. FIG. 2A illustrates an example structured light pattern including a straight line at any desired angle. FIG. 2B illustrates an example structured light pattern including a two-dimensional array of equally spaced light spots (a grid or matrix). FIG. 2C illustrates an example structured light pattern including multiple one-dimensional light patterns, where each one-dimensional light pattern includes a one-dimensional array of light spots. FIG. 2D illustrates an example structured light pattern including multiple one-dimensional light patterns, where each one-dimensional light pattern includes a vertical line. FIG. 2E illustrates an example structured light pattern in the shape of a pie chart.

It is noted that the examples shown in FIGS. 2A-2E are just some representative examples. A structured light pattern may include any desired simple or complex pattern shown or not shown in FIGS. 2A-2E. The structured light patterns may be obtained by using diffractive optical elements (DOEs), such as ruled gratings, holographic gratings, multilevel DOEs (i.e., binary optical elements), micro-optical elements, nano-optical elements, computer-generated holograms, etc. Because the feature sizes of these optical elements are generally comparable to or smaller than the working wavelength of the light source (e.g., any suitable laser source), optical diffraction theory or electromagnetic field theory may be used to design or analyze such optical elements. For example, the overall electrical (or light) field at a spot may be determined by coherently summing electromagnetic waves from each region of the diffractive optical element, where each region of the diffractive optical element may modify the amplitude and/or phase of the electromagnetic wave from the source. An example analysis of a one-dimensional optical grating is provided below to facilitate the understanding of the present disclosure. A person skilled in the art would understand that various complex numerical optimization techniques and commercial computer-aided design software packages (e.g., ZEMAX®) may be used to design and/or analyze a complex diffractive optical element to achieve a desired light pattern.

Figure 3:
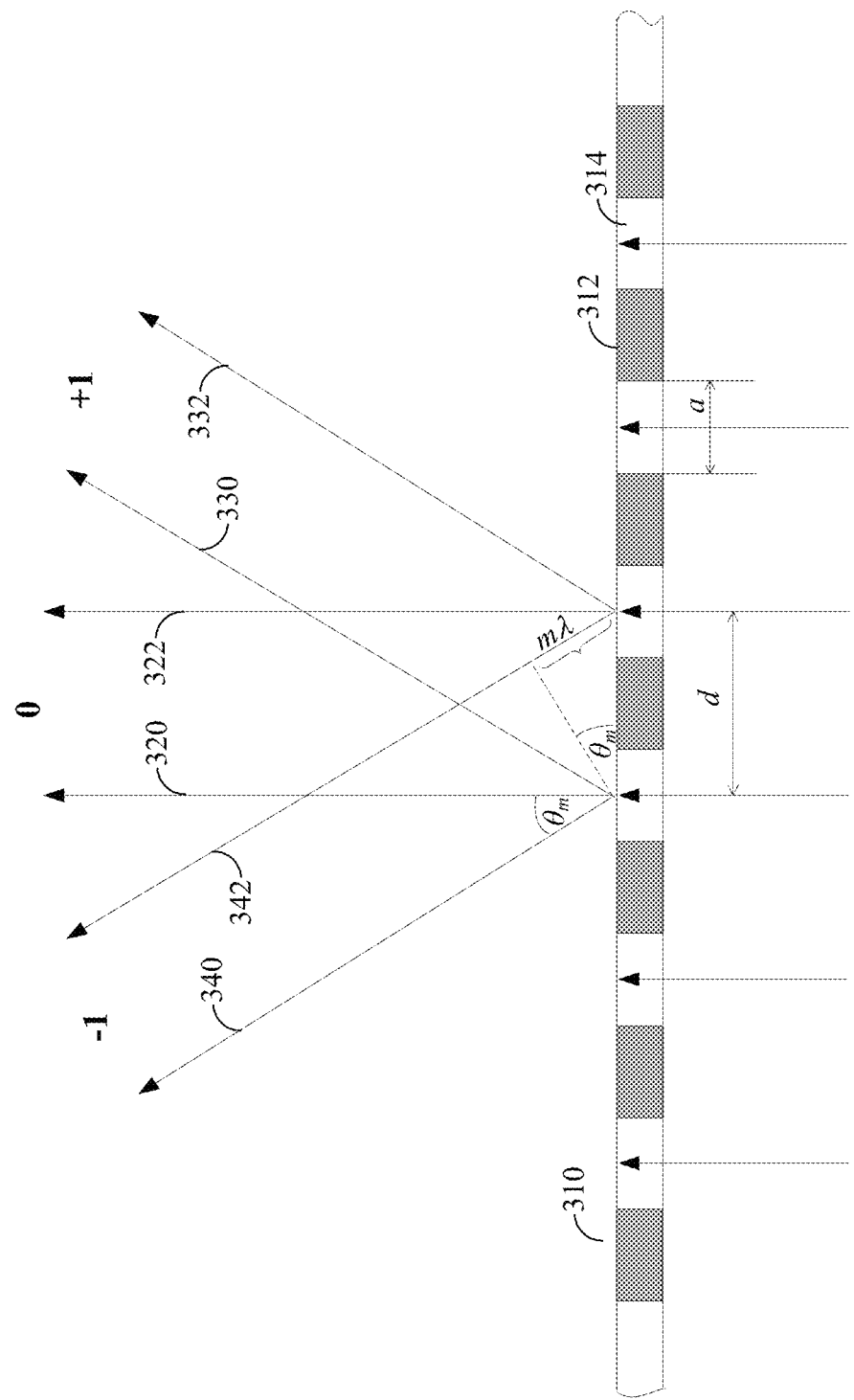
FIG. 3 illustrates example optical diffractions by an example one-dimensional grating.

FIG. 3 illustrates optical diffractions by an example one-dimensional diffraction grating 310. A diffraction grating may include a quasi-one dimensional structure consisting of a series of parallel slits, notches, lines, steps, etc. (which may be referred to as grating grooves). In the example, one-dimensional optical grating 310 may be a transmission grating with multiple grooves 312, where each groove 312 may have a length d and may include a slit 314 with a width a. According to the Huygens-Fresnel principle, when a plane wave is incident on the grating, each groove 312 (or slit 314) may act like a point source, emitting a spherical wave (or more accurately, a cylindrical wave). The wavefront of the propagating wave at any subsequent point can be found by summing the contributions from each of these individual point sources. For certain angles, there will be a destructive interference. For some other angles, there may be a constructive interference. The peaks of the constructive interference may be referred to as diffraction orders. The diffraction angle $\theta_m$ for the mth diffraction order may be determined by the following grating equation:

$$d \sin \theta_m = m\lambda,$$

where $\lambda$ is the wavelength of the incident wave. For example, for zero order diffraction (transmission) represented by lines 320 and 322, the diffraction angle is 0. For the +1th diffraction order represented by lines 330 and 332, the diffraction angle is positive (to the right of the zero order). For the −1th diffraction order represented by lines 340 and 342, the diffraction angle is negative (to the left of the zero order).

It can be seen from the above grating equation that, when the grating period d is smaller, the diffraction angle $\theta_m$ for the same mth diffraction order becomes larger. In other words, when the grating period d is small, the different diffraction orders are widely spread. Conversely, when the grating period d is larger, the diffraction angle $\theta_m$ for the same mth diffraction order becomes smaller. Thus, when the grating period d is large, the different diffraction orders may be more narrowly spaced or more densely packed.

The intensity of the electrical field of the plane wave at angle $\theta$ may be determined by the diffraction by a single slit and the interference by the multiple slits of the grating. For example, when N grooves of the diffraction grating are illuminated by the incident wave, the intensity of the electrical field of the plane wave at angle $\theta$ may be determined by:

$$I(\theta) = I_0 \left[ \text{sinc}\left(\frac{\pi a}{\lambda} \sin\theta\right) \right]^2 \left[ \frac{\sin\left(\frac{N\pi d}{\lambda} \sin\theta\right)}{\sin\left(\frac{\pi d}{\lambda} \sin\theta\right)} \right]^2,$$

where the factor $$\left[ \text{sinc}\left(\frac{\pi a}{\lambda} \sin\theta\right) \right]^2$$

represents the diffraction effect of a single slit with a width a, and the factor $$\left[ \frac{\sin\left(\frac{N\pi d}{\lambda} \sin\theta\right)}{\sin\left(\frac{\pi d}{\lambda} \sin\theta\right)} \right]^2$$

represents the interference effect of the N grooves (or slits) of the grating.

Figure 4A:
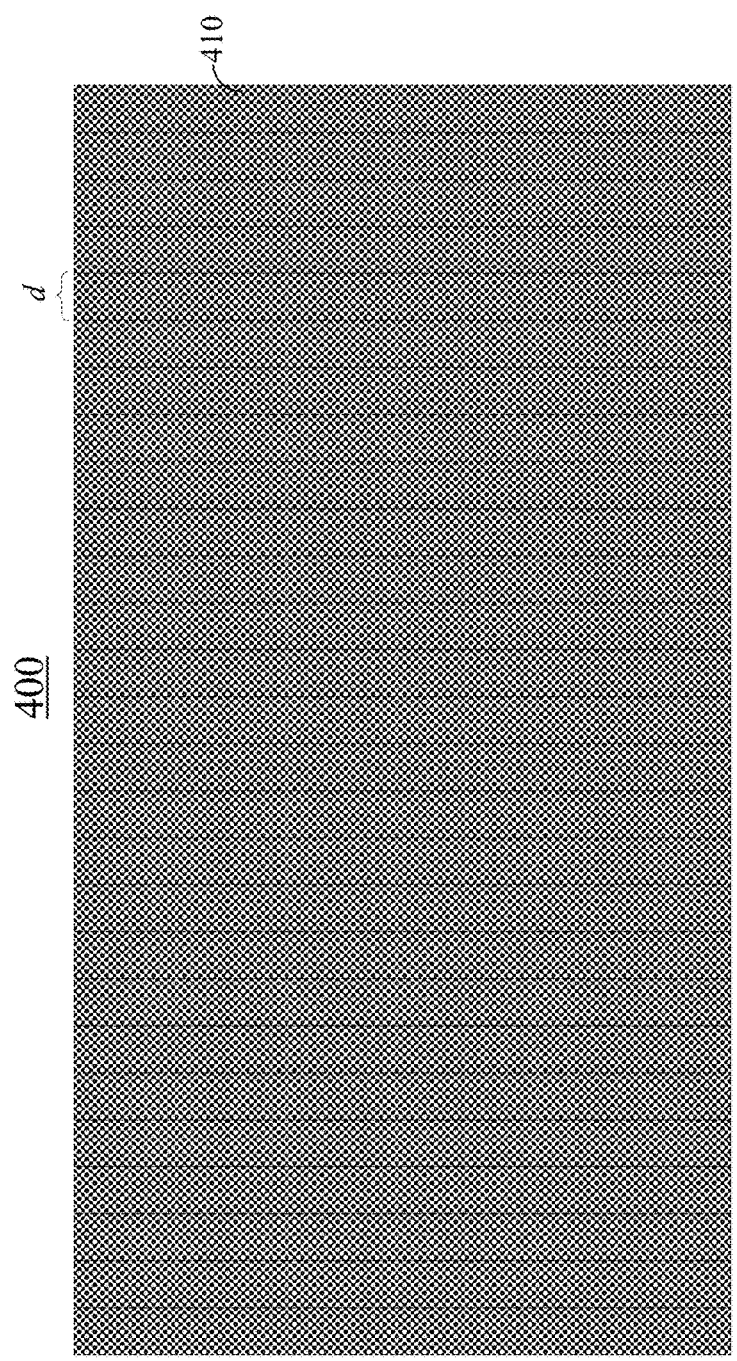
FIG. 4A illustrates an example one-dimensional diffractive optical element for generating a one-dimensional structured light pattern including multiple diffraction spots.

FIG. 4A illustrates an example one-dimensional diffractive optical element 400 for generating a one-dimensional structured light pattern including multiple diffraction spots. One-dimensional diffractive optical element 400 may include a plurality of grooves 410 arranged in a one-dimensional array. Each groove 410 may have a width d and may have any desired amplitude and/or phase profile within the groove. One-dimensional diffractive optical element 400 may be transmissive or reflective.

Figure 4B:
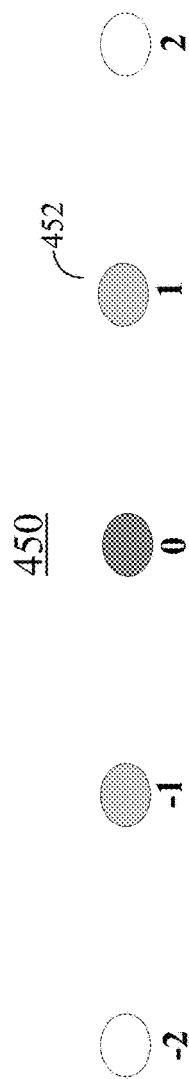
FIG. 4B illustrates an example one-dimensional structured light pattern including multiple diffraction spots generated by the one-dimensional diffractive optical element of FIG. 4A.

FIG. 4B illustrates an example one-dimensional structured light pattern 450 including multiple diffraction spots 452 generated by the one-dimensional diffractive optical element 400 of FIG. 4A. In the representative example shown in FIG. 4B, one-dimensional structured light pattern 450 includes 5 diffraction spots 452 with non-uniform intensities. Because the period d of one-dimensional diffractive optical element 400 is relative small, the separation between the diffraction spots are relatively large.

Figure 5:
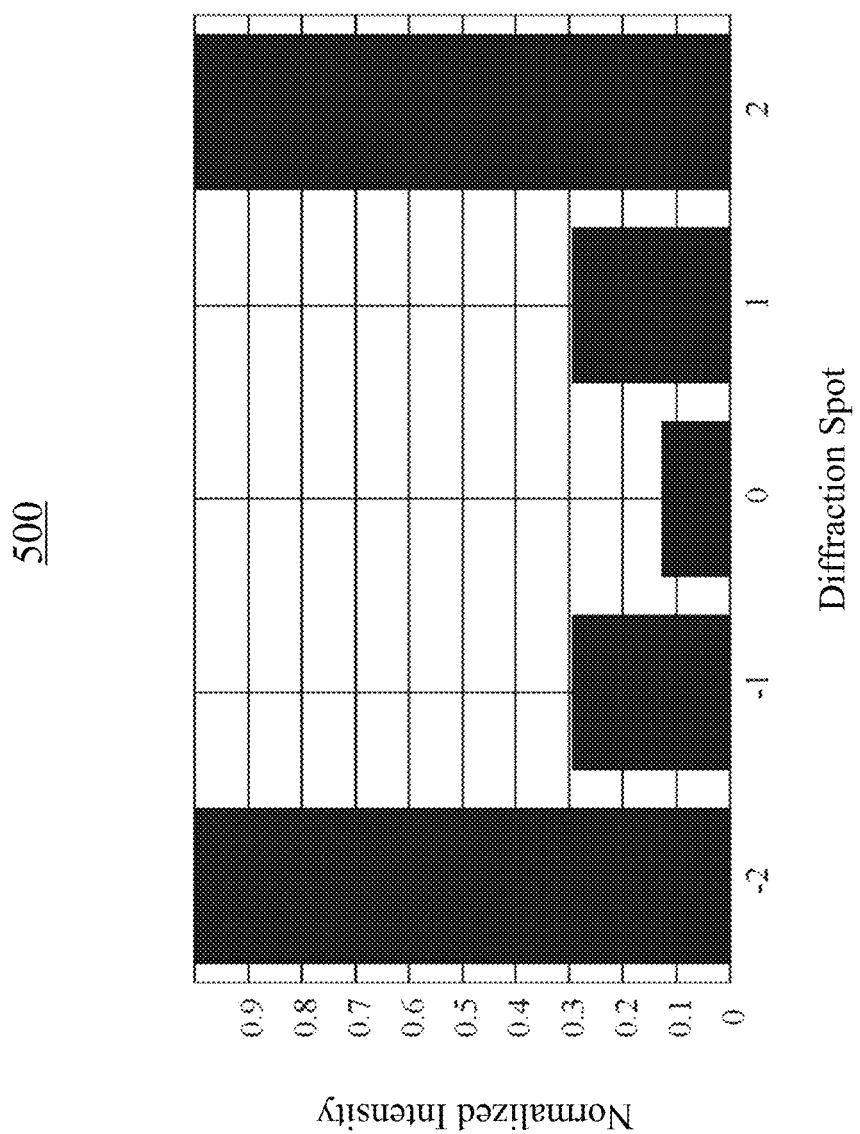
FIG. 5 illustrates the desired intensity profile of an example one-dimensional structured light pattern including multiple diffraction spots.

FIG. 5 illustrates the desired or designed intensity profile 500 of an example one-dimensional structured light pattern including multiple diffraction spots. In the example, the intensities of the diffraction spots are not uniform and are normalized based on the maximum desired intensity. In some applications, it may be desirable to use a structured light pattern with a uniform intensity profile. In some applications, it may be desirable to use a structured light pattern with a non-uniform intensity profile, such as the one shown in FIG. 5 where the light intensity of the diffraction spot at the center is the lowest and the light intensity of the outermost diffract spots (±2nd order in FIG. 5) is the highest. This may be used to pre-compensate for the different losses of the different diffraction orders during the propagation and reflection on different paths. It is noted that the techniques disclosed herein can be used to achieve any desired intensity profile (or pattern), regardless of whether the desired intensity profile is uniform or non-uniform.

Figure 6:
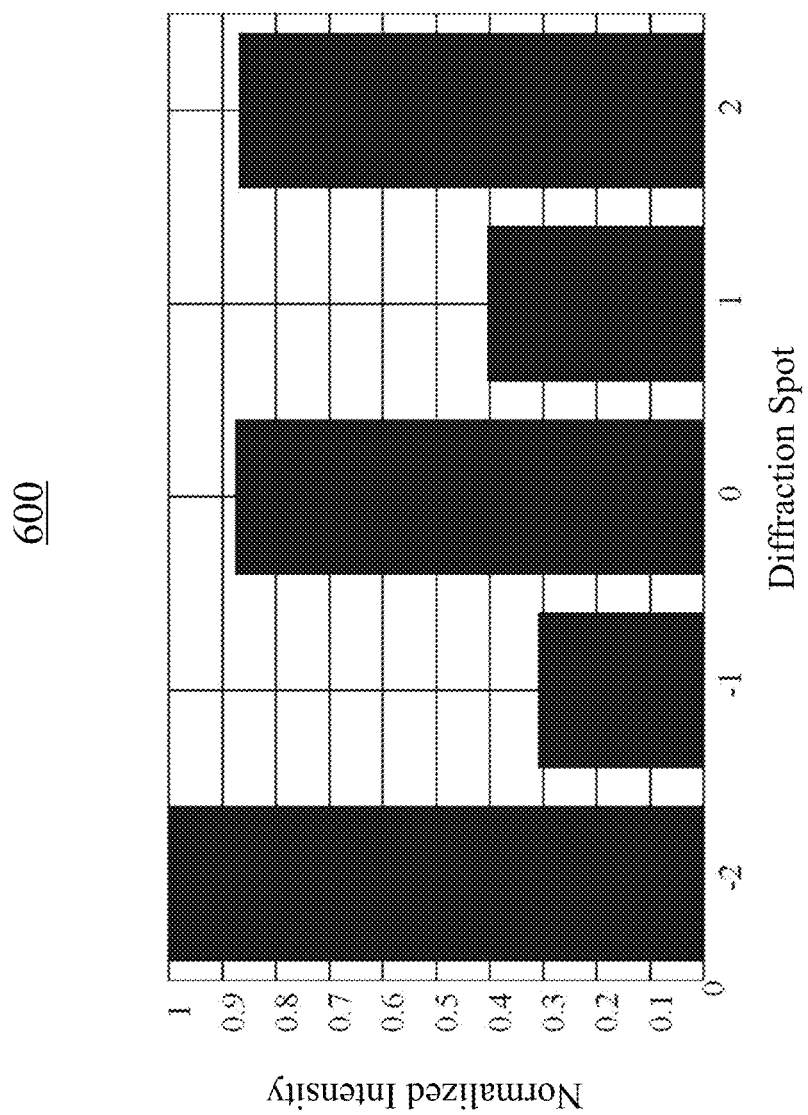
FIG. 6 illustrates the normalized actual intensity profile of an example one-dimensional structured light pattern including multiple diffraction spots generated by an example one-dimensional diffractive optical element with manufactured errors or design approximations.

FIG. 6 illustrates the normalized actual intensity profile 600 of an example one-dimensional structured light pattern including multiple diffraction spots generated by an example one-dimensional diffractive optical element with manufactured errors or design approximations. The target or desired intensity profile of the one-dimensional structured light pattern to be generated by the designed one-dimensional diffractive optical element is shown in FIG. 5. Due to manufacturing errors and/or design approximations, the actual intensity profile 600 differs significantly from the desired intensity profile 500. For example, intensity profile 600 shows a much stronger-than-desired zero order. Thus, the example one-dimensional diffractive optical element may not meet the requirements of the intended applications.

Techniques disclosed herein may generate the 1-D multi-spot pattern with the desired intensity profile while having an improved tolerance for design and manufacturing inaccuracy, such as manufacturing process variations or defects, and/or design approximations or round-off errors. Thus, the diffractive optical elements can be designed and manufactured with a higher yield (and thus a lower cost per device) using existing fabrication techniques. In one implementation, a 2-D DOE with different periods in two orthogonal dimensions may be used to generate an aggregated one-dimensional multi-spot pattern with a desired intensity profile. For example, the period in one dimension of the DOE may be much larger than (e.g., more than 100 times or more of) the period of the DOE in the orthogonal dimension. As a result, a plurality of densely packed 1-D multi-spot patterns may be generated by the 2-D DOE. The plurality of densely packed 1-D multi-spot patterns may at least partially overlap with each other at a target plane such that the aggregated light pattern may appear to be a 1-D multi-spot pattern, where each spot of the aggregated 1-D multi-spot pattern may include an array of densely packed small diffraction spots arranged in a direction different from the direction of the desired 1-D multi-spot pattern. Thus, the overall intensity of each spot of the aggregated 1-D multi-spot pattern at a given area may be the sum (or average) of the intensities of the densely packed small spots, and therefore may be less affected by the variation of the intensity of each individual densely packed small spot.

Figure 7:
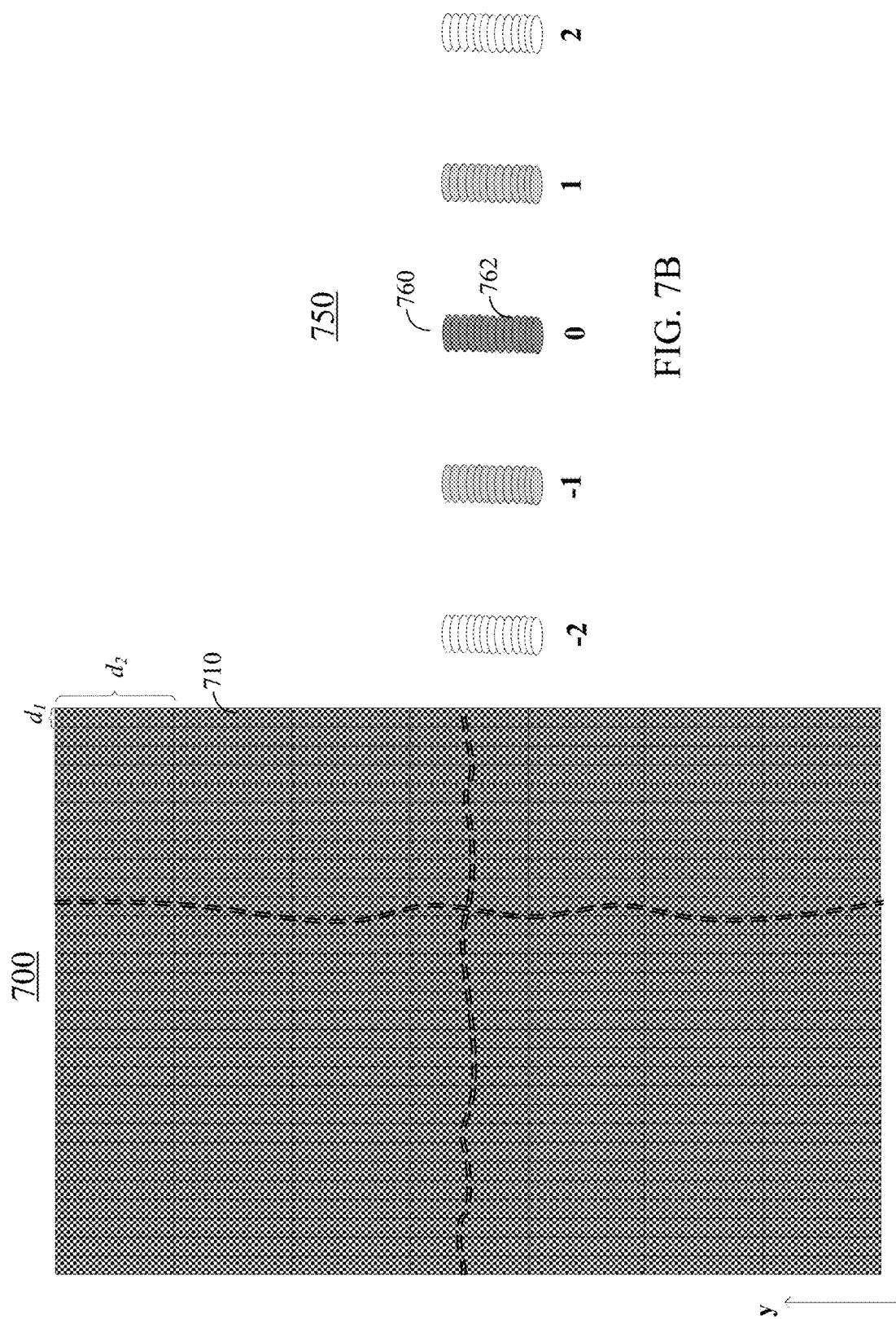
FIG. 7A illustrates an example two-dimensional diffractive optical element for generating a one-dimensional structured light pattern including multiple diffraction spots and having a desired intensity pattern, according to certain embodiments.
FIG. 7B illustrates an example one-dimensional structured light pattern including multiple diffraction spots generated by the two-dimensional diffractive optical element of FIG. 7A, where each diffraction spot includes multiple densely packed small diffraction spots, according to certain embodiments.

FIG. 7A illustrates an example two-dimensional diffractive optical element 700 for generating a one-dimensional structured light pattern including multiple diffraction spots and having a desired intensity pattern, according to certain embodiments. Two-dimensional diffractive optical element 700 may include a plurality of tiles 710 arranged in a two-dimensional array. Each tile 710 may have a size of $d_1 \times d_2$. Thus, the period of two-dimensional diffractive optical element 700 in the x direction may be $d_1$, and the period of two-dimensional diffractive optical element 700 in the y direction may be $d_2$. In various implementations, $d_1$ may be much smaller than $d_2$. For example, in some implementations, $d_1$ may be less than one hundredth of $d_2$. Each tile 710 may have any desired (continuous or multilevel) amplitude and/or phase profile within the tile. Two-dimensional diffractive optical element 700 may be either transmissive or reflective.

FIG. 7B illustrates an example one-dimensional structured light pattern 750 including multiple diffraction spots generated by the example two-dimensional diffractive optical element 700 of FIG. 7A, where each diffraction spot includes multiple densely packed small diffraction spots, according to certain embodiments. In the example, one-dimensional structured light pattern 750 includes 5 large diffraction spots 760 with non-uniform intensities. Because the period $d_1$ of two-dimensional diffractive optical element 700 in the x direction is relative small, the separation between the 5 large diffraction spots in the x direction is relatively large. Each large diffraction spot 760 may include a plurality of small diffraction spots 762 distributed in the y direction. Because the period $d_2$ of two-dimensional diffractive optical element 700 in the y direction is relative large, the separation between the small diffraction spots in the y direction is relatively small. As shown in FIG. 7B, small diffraction spots 762 in a large diffraction spot may at least partially overlap in the y direction on a target plane, and thus may aggregately form a continuous large diffraction spot 760 on the target plane.

Structured light pattern 750 may also be viewed as a plurality of closed packed one-dimensional light patterns each including 5 small diffraction spots in the x direction, where a separation between two adjacent one-dimensional light patterns is much smaller than the separation between two adjacent diffraction spots in each one-dimensional light pattern. For example, the separation angle between each pair of adjacent one-dimensional light patterns of the plurality of one-dimensional light patterns in the second direction and with respect to the two-dimensional diffractive optical element is less than 0.5 degree, less than 0.2 degree, or less than 0.1 degree. Such separation may be achieved by designing two-dimensional diffractive optical element 700 to have a period in the second direction (e.g., y direction) at least 40, 100, or 200 times of a period in the first direction (e.g., x direction).

In some implementations, an angle of view of one-dimensional structured light pattern 750 with respect to the projector may be greater than 100° (e.g., greater than 140°) in the x direction, and an angle of view of one-dimensional structured light pattern 750 with respect to the projector may be less than 5°, 2°, or 1° in the y direction. Thus, overall, structured light pattern 750 may appear to be one dimensional.

In some implementations, an optical element, such as a cylindrical lens, an asymmetrical lens, or a diffractive optical element, may be used to concentrate light of the plurality of one-dimensional light patterns in the y-direction to further reduce the angle of view of one-dimensional structured light pattern 750 with respect to the projector in the y direction. In some implementations, an optical element, such as an optical beam homogenizer or an optical diffuser, may be used to combine small diffraction spots 762 distributed in the y direction to create large diffraction spot 760 with a more uniform power distribution across the spot. The optical beam homogenizer or optical diffuser may include, for example, a micro-lens array, a micro-mirror array, a micro-prism array, a diffractive optical element, and the like.

Figure 8:
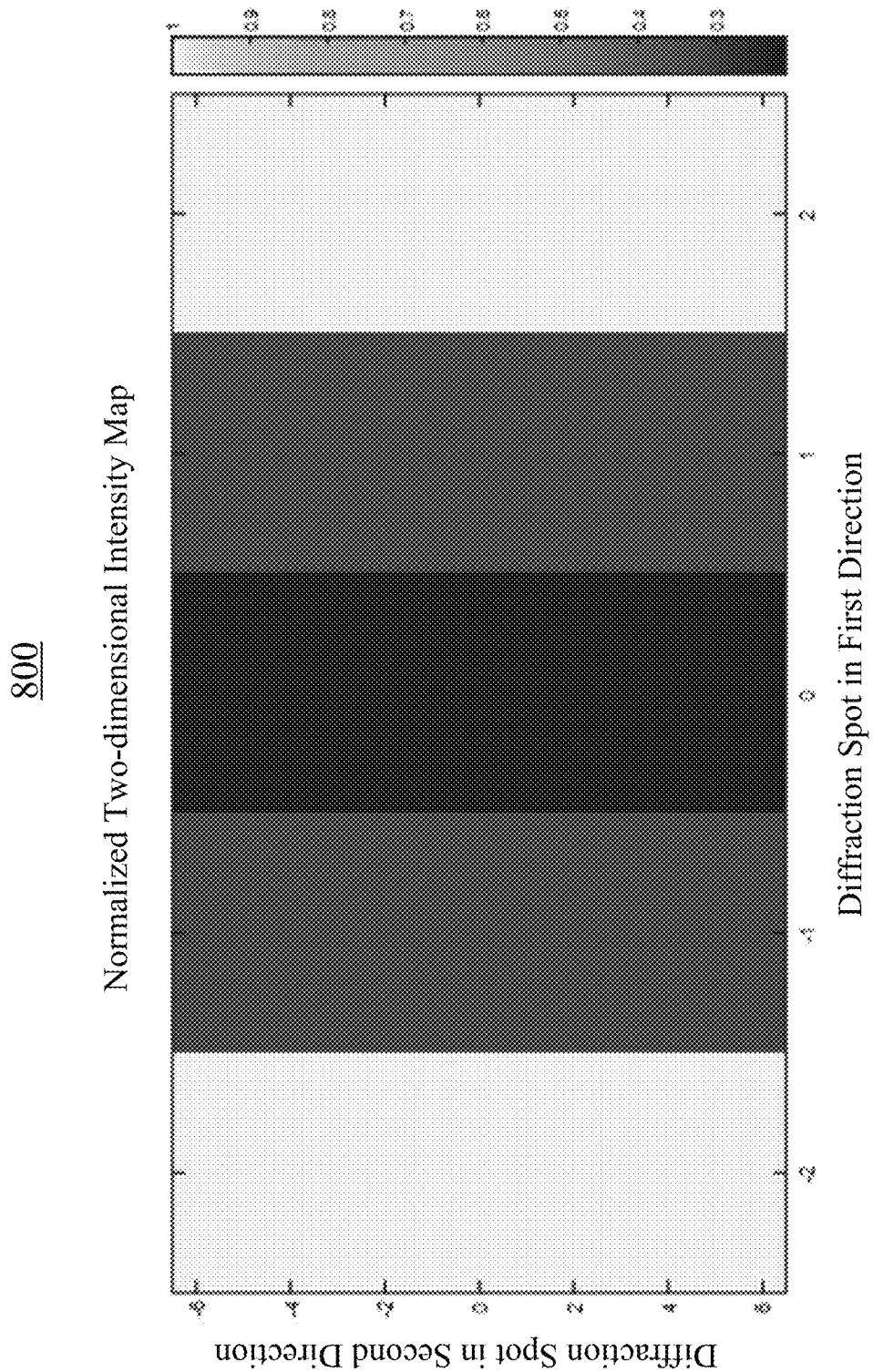
FIG. 8 illustrates the designed intensity profile of an example one-dimensional structured light pattern comprising multiple beam spots each formed by a plurality of densely packed small diffraction spots, according to certain embodiments.

FIG. 8 illustrates the desired or designed intensity profile 800 of an example one-dimensional structured light pattern comprising multiple beam spots each formed by a plurality of densely packed small diffraction spots, according to certain embodiments. The one-dimensional structured light pattern may include 5 large diffraction spots distributed in the first direction. Each of the 5 large diffraction spots may include 13 small diffraction spots densely distributed in the second direction. The desired intensities of the 5 large diffraction spots may be non-uniform as represented by the different gray scale levels. The designed intensities of the 13 small diffraction spots for each large diffraction spot may be the same. The desired intensities shown in FIG. 8 is normalized based on the maximum desired intensity.

Figure 9:
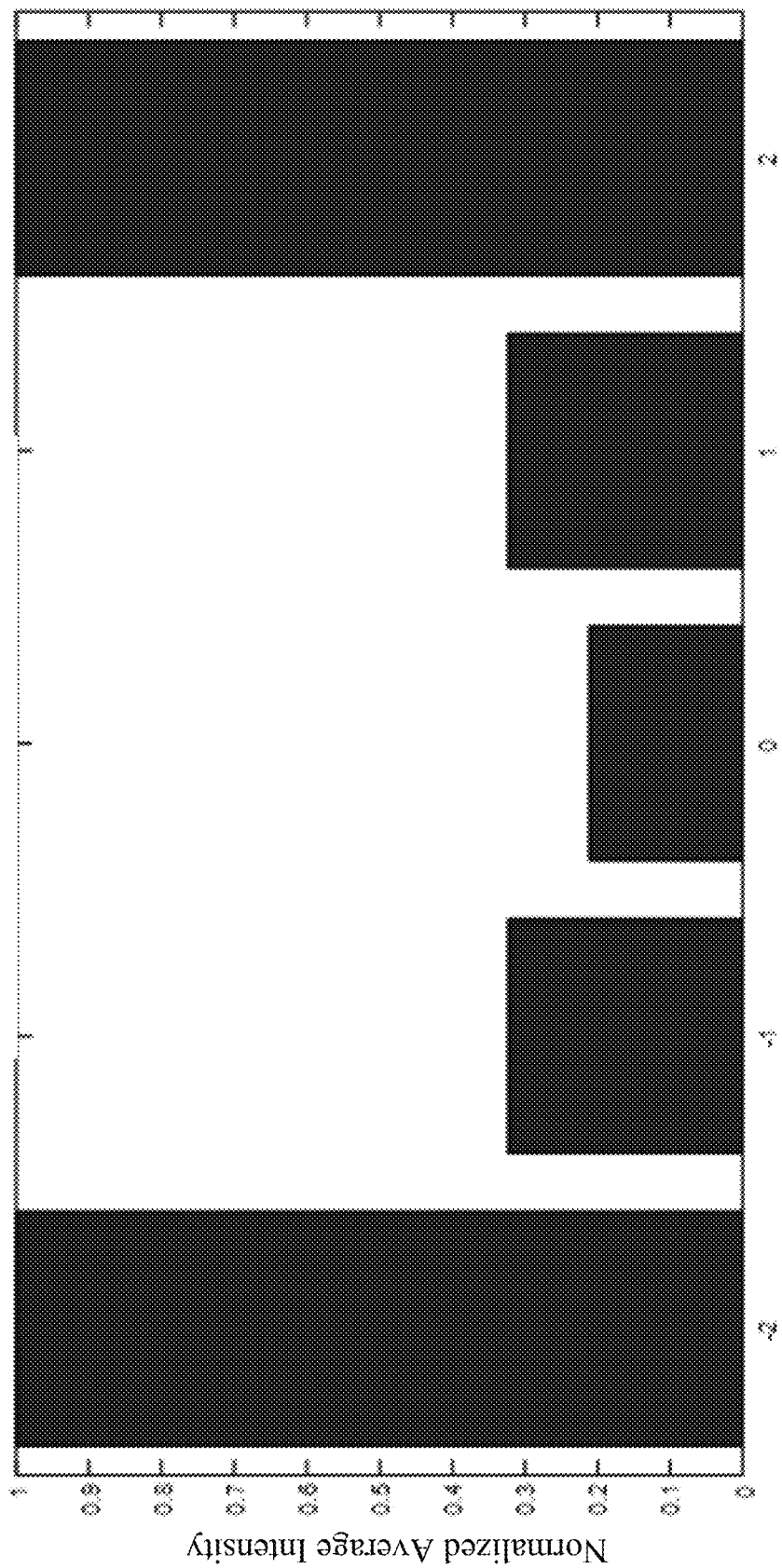
FIG. 9 illustrates the averaged intensity profile of the one-dimensional structured light pattern comprising multiple beam spots each formed by a plurality of densely packed small diffraction spots shown in FIG. 8, according to certain embodiments.

FIG. 9 illustrates the averaged intensity profile 900 of the one-dimensional structured light pattern comprising multiple beam spots each formed by a plurality of densely packed small diffraction spots shown in FIG. 8, according to certain embodiments. In FIG. 9, the intensity of each of the five large diffraction spots may be the average (or sum) of the intensities of the 13 small diffraction spots included in the large diffraction spot.

Figure 10:
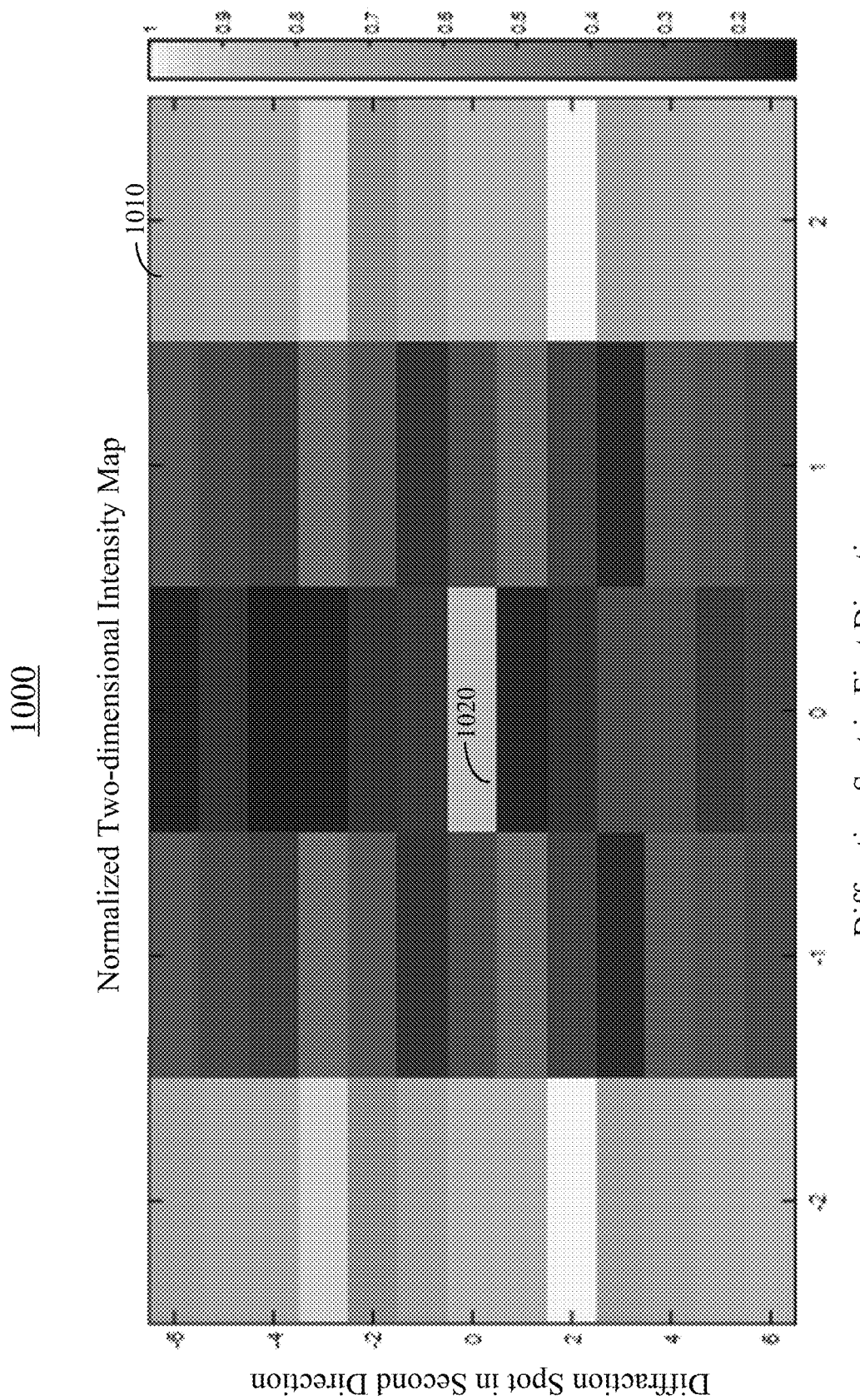
FIG. 10 illustrates the actual intensity profile of an example one-dimensional structured light pattern comprising multiple beam spots each formed by a plurality of densely packed small diffraction spots, where the relative intensities of at least some small diffraction spots may be different from the designed intensities due to, for example, manufacturing errors.

FIG. 10 illustrates the actual intensity profile 1000 of an example one-dimensional structured light pattern comprising multiple large beam spots each formed by a plurality of densely packed small diffraction spots 1010, according to certain embodiments. The actual intensities of at least some small diffraction spots 1010 may be significantly different from the designed intensities (as shown in FIG. 8) due to, for example, manufacturing errors or manufacturing process variations. For example, the actual intensities of the 13 small diffraction spots for each large diffraction spot may not be uniform. The center small spot 1020 may have an intensity that is much higher than the designed intensity. However, because the 13 small diffraction spots for each large diffraction spot are closely distributed, they form an indistinguishable single large diffraction spot. The overall intensity of the large diffraction spot (which may be the average or sum of the intensities of the 13 small diffraction spots) may be significantly different from the intensities of some erroneous individual small diffraction spots.

Figure 11:
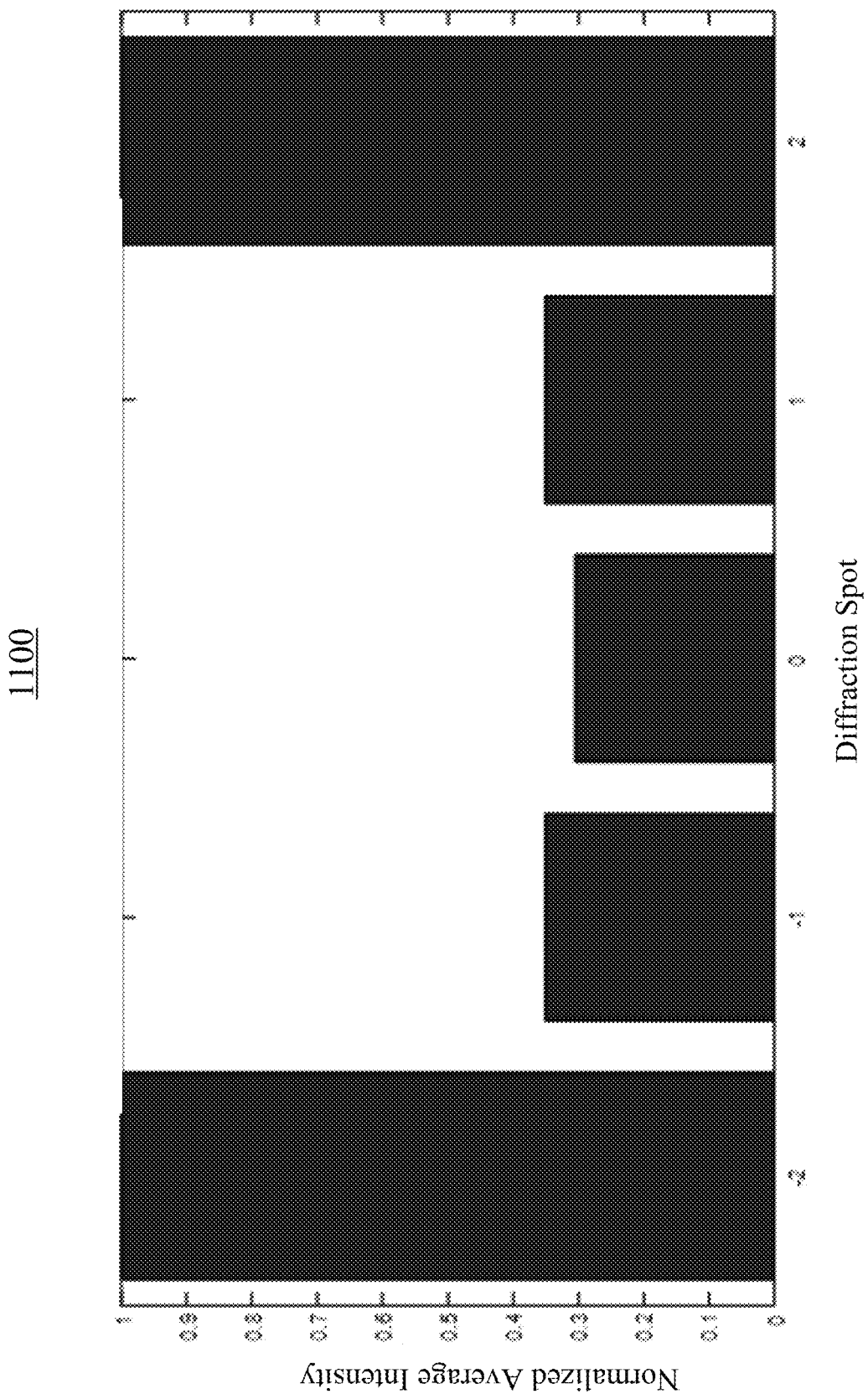
FIG. 11 illustrates the averaged intensity profile of the one-dimensional structured light pattern comprising multiple beam spots each formed by a plurality of densely packed small diffraction spots shown in FIG. 10, according to certain embodiments.

FIG. 11 illustrates the averaged intensity profile 1100 of the one-dimensional structured light pattern comprising multiple beam spots each formed by a plurality of densely packed small diffraction spots shown in FIG. 10, according to certain embodiments. As shown in FIG. 11, the averaged intensity profile 1100 is very close to the designed intensity profile 900, in spite of the variations of the intensities of some individual small diffraction spots shown in FIG. 10.

In some implementations, a one-dimensional structured light pattern with a desired intensity pattern may be generated by a first optical element (e.g., a two-dimensional diffractive optical element with comparable periods in two orthogonal directions) configured to generate a two-dimensional light pattern, and a second optical element configured to concentrate light in at least one direction. For example, the two-dimensional diffractive optical element may generate a two-dimensional light pattern that includes a plurality of one-dimensional light patterns, such as the two-dimensional light patterns shown in FIGS. 2B-2D. The second optical element may be configured to concentrate the two-dimensional light pattern at least in a direction perpendicular to each of the plurality of one-dimensional light patterns, such that the light spots in the direction perpendicular to each of the plurality of one-dimensional light patterns may be combined into one light spot. In some implementations, the second optical element may include, for example, a cylindrical lens or an asymmetrical lens.

Figure 12:
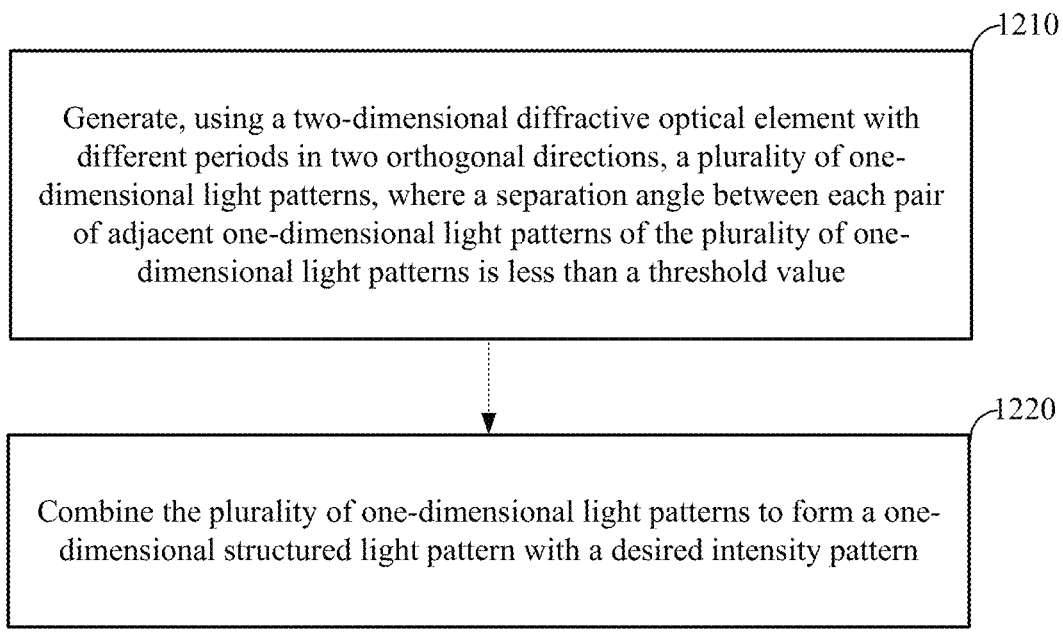
FIG. 12 is a flow chart illustrating an example method for generating a one-dimensional structured light pattern with a desired intensity pattern, according to certain embodiments.

FIG. 12 is a flow chart illustrating an example method 1200 for generating a one-dimensional structured light pattern with a desired intensity pattern, according to certain embodiments. The method may be performed by, for example, projector 110 of FIG. 1, using a two-dimensional diffractive optical element, such as two-dimensional diffractive optical element 700 of FIG. 7A.

At block 1210, a plurality of one-dimensional light patterns may be generated using a two-dimensional diffractive optical element with different periods in two orthogonal directions. Each of the one-dimensional light patterns may include a one-dimensional light pattern in the first direction. The plurality of one-dimensional light patterns may be distributed in a second direction different from the first direction. A separation angle between each pair of adjacent one-dimensional light patterns of the plurality of one-dimensional light patterns in the second direction and with respect to the two-dimensional diffractive optical element may be less than a threshold value. For example, in some implementations, the separation angle between each pair of adjacent one-dimensional light patterns of the plurality of one-dimensional light patterns in the second direction and with respect to the two-dimensional diffractive optical element may be less than 0.5 degree, less than 0.2 degree, or less than 0.1 degree. Such a separation may be achieved by designing the two-dimensional diffractive optical element to have a period in the second direction at least 40, 100, 150, or 200 times of a period in the first direction.

At block 1220, the plurality of one-dimensional light patterns may be combined to form the one-dimensional structured light pattern with the desired intensity pattern. As described above, the separation angle between each pair of adjacent one-dimensional light patterns of the plurality of one-dimensional light patterns in the second direction and with respect to the two-dimensional diffractive optical element may be less than a threshold value, such as 0.5 degree, 0.2 degree, or 0.1 degree. Thus, each pair of adjacent one-dimensional light patterns of the plurality of one-dimensional light patterns may at least partially overlap in the second direction to form larger beam spots at a target plane. In this way, the overall intensity of the larger beam spot may be the average or the sum of the intensities of multiple small beam spots.

It is noted that even though the examples described above relate to generate a one-dimensional structured light pattern with a desired intensity profile, techniques described herein may also be used to generate a two-dimensional structured light pattern with a desired intensity profile. For example, techniques described herein may also be used to generate a two-dimensional structured light pattern shown in FIG. 2C with a desired intensity profile. In one example implementation, five two-dimensional diffractive optical elements (e.g., two-dimensional diffractive optical elements 700) may be used to generate the two-dimensional structured light pattern shown in FIG. 2C with the desired intensity profile, where each two-dimensional diffractive optical element (e.g., two-dimensional diffractive optical element 700) may be used to generate one of the five horizontal lines of the two-dimensional structured light pattern shown in FIG. 2C with the desired intensity profile.

Various general purpose or special purpose devices may be used to implement some of the methods or perform some of the operations disclosed herein. The devices may be portable (e.g., a mobile phone or a laptop computer) or stationary (e.g., a general purpose desktop computer or a server). Some devices may include some or all components for performing some or all operations disclosed herein. Some devices may be combined with one or more other devices to perform some or all operations disclosed herein.

Figure 13:
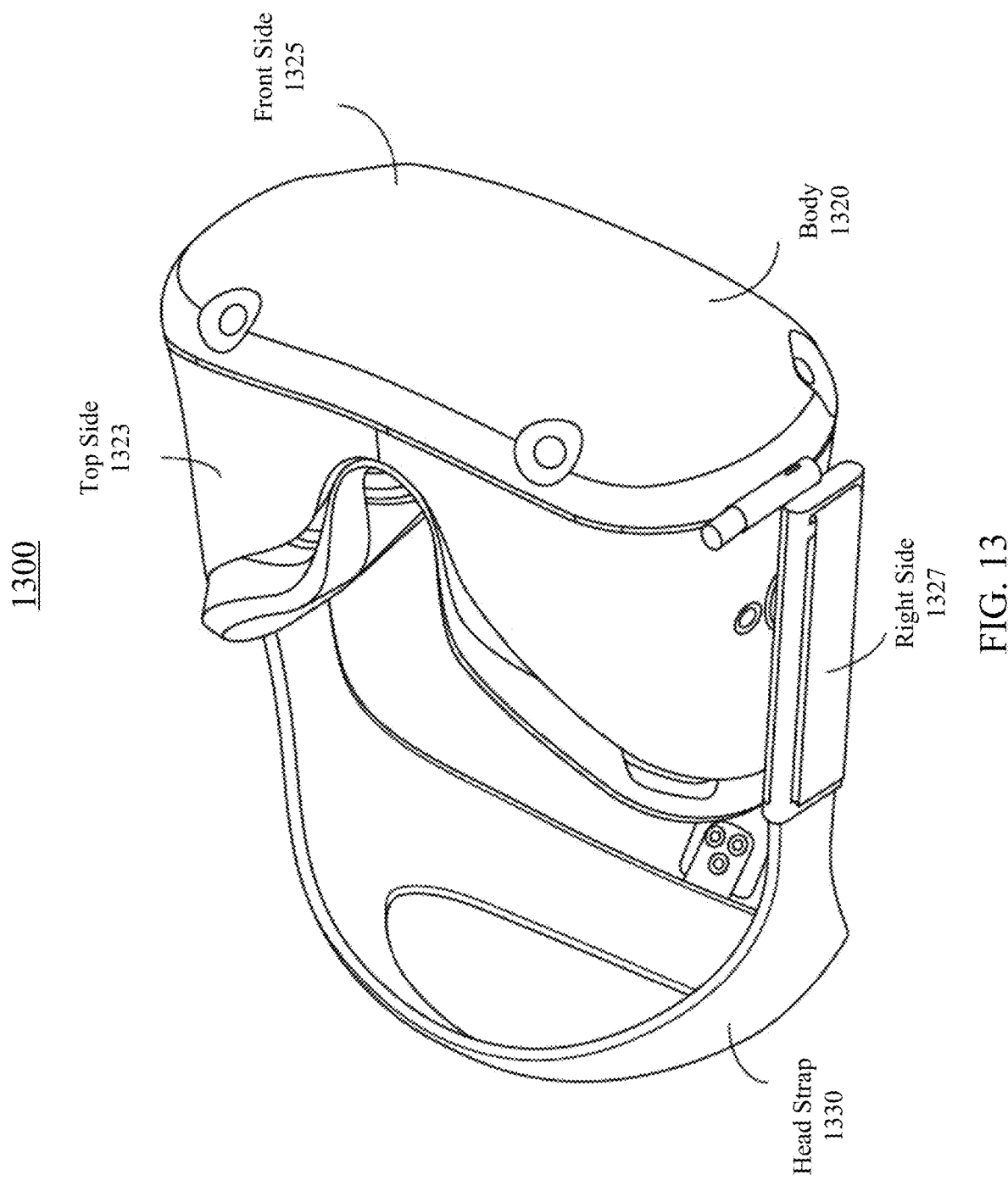
FIG. 13 is a perspective view of an example head-mounted display (HMD) device for implementing some of the examples disclosed herein.

FIG. 13 is a perspective view of an example head-mounted display (HMD) device 1300 for implementing some of the examples disclosed herein. HMD device 100 may be a part of, e.g., a virtual reality (VR) system, an augmented reality (AR) system, a mixed reality (MR) system, or some combinations thereof. HMD device 1300 may include a body 1320 and a head strap 1330. FIG. 13 shows a top side 1323, a front side 1325, and a right side 1327 of body 1320 in the perspective view. Head strap 1330 may have an adjustable or extendible length. There may be a sufficient space between body 1320 and head strap 1330 of HMD device 1300 for allowing a user to mount HMD device 1300 onto the user's head. In various embodiments, HMD device 1300 may include additional, fewer, or different components. For example, in some embodiments, HMD device 1300 may include eyeglasses temples and temples tips, rather than head strap 1330.

HMD device 1300 may present to a user media including virtual and/or augmented views of a physical, real-world environment with computer-generated elements. Examples of the media presented by HMD device 1300 may include images (e.g., two-dimensional (2D) or three-dimensional (3D) images), videos (e.g., 2D or 3D videos), audios, or some combinations thereof.

The images and videos may be presented to each eye of the user by one or more display assemblies (not shown in FIG. 13) enclosed in body 1320 of HMD device 1300. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 1300 may include two eye box regions.

In some implementations, HMD device 1300 may include various sensors (not shown), such as depth sensors (e.g., system 100), motion sensors, position sensors, and eye tracking sensors. At least some of these sensors may use a structured light pattern for sensing. In some implementations, HMD device 1300 may include an input/output interface for communicating with a console. In some implementations, HMD device 1300 may include a virtual reality engine (not shown) that can execute applications within HMD device 1300 and receive depth information, position information, acceleration information, velocity information, predicted future positions, or some combination thereof of HMD device 1300 from the various sensors. In some implementations, the information received by the virtual reality engine may be used for producing a signal (e.g., display instructions) to the one or more display assemblies.

Figure 14:
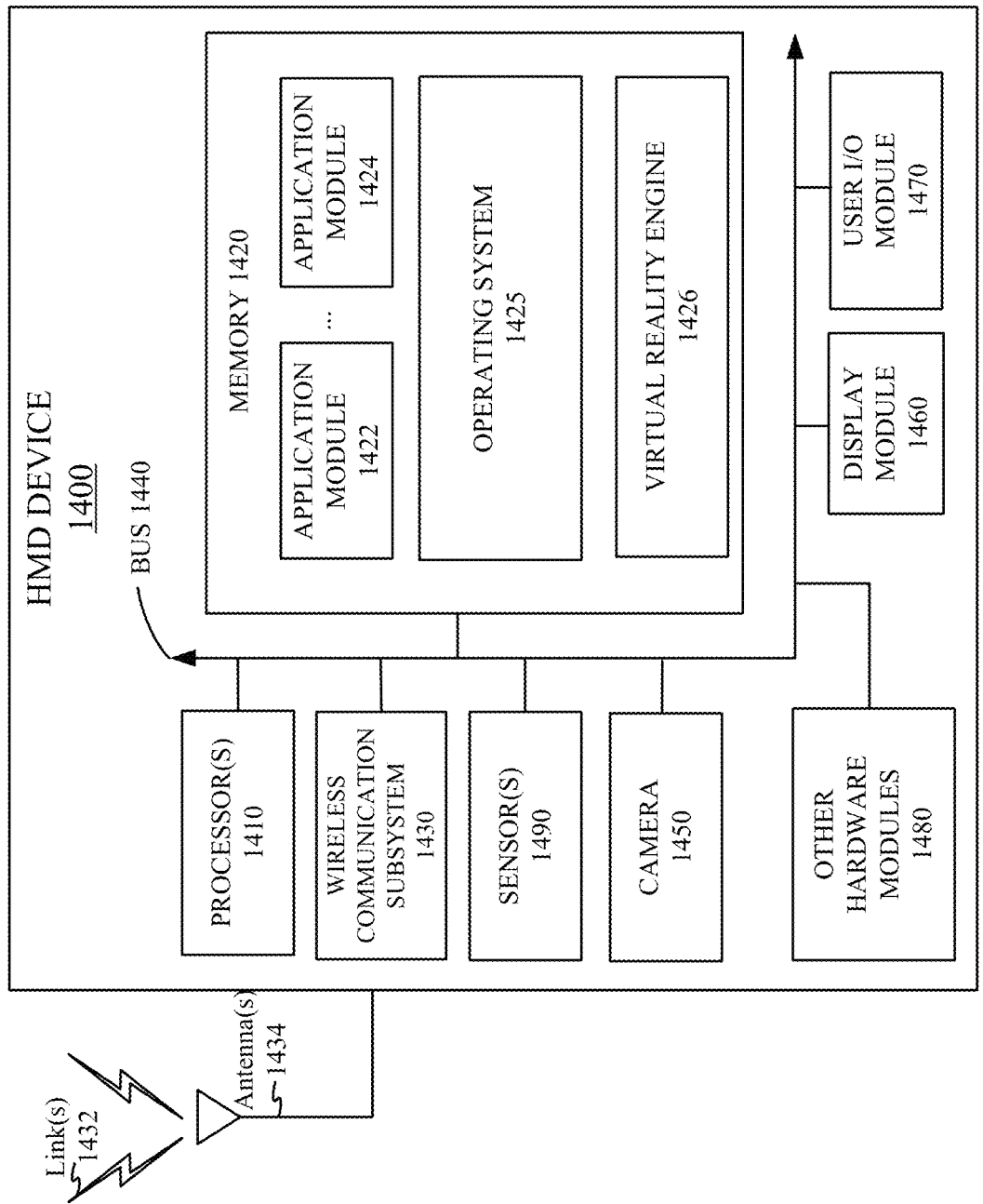
FIG. 14 is a simplified block diagram of an electronic system of an example HMD device for implementing some of the examples disclosed herein.

FIG. 14 is a simplified block diagram of an electronic system of an example HMD device 1400 for implementing some of the examples disclosed herein. HMD device 1400 may be used to implement HMD device 1300. In this example, HMD device 1400 may include one or more processor(s) 1410 and a memory 1420. Processor(s) 1410 may be configured to execute instructions for performing operations at a number of components, and can be, for example, a general-purpose processor or microprocessor suitable for implementation within a portable electronic device. Processor(s) 1410 may be communicatively coupled with a plurality of components within HMD device 1400. To realize this communicative coupling, processor(s) 1410 may communicate with the other illustrated components across a bus 1440. Bus 1440 may be any subsystem adapted to transfer data within HMD device 1400. Bus 1440 may include a plurality of computer buses and additional circuitry to transfer data.

Memory 1420 may be coupled to processor(s) 1410. In some embodiments, memory 1420 may offer both short-term and long-term storage and may be divided into several units. Memory 1420 may be volatile, such as static random access memory (SRAM) and/or dynamic random access memory (DRAM) and/or non-volatile, such as read-only memory (ROM), flash memory, and the like. Furthermore, memory 1420 may include removable storage devices, such as secure digital (SD) cards. Memory 1420 may provide storage of computer-readable instructions, data structures, program modules, and other data for HMD device 1400. In some embodiments, memory 1420 may be distributed into different hardware modules. A set of instructions and/or code might be stored on memory 1420. The instructions might take the form of executable code that may be executable by HMD device 1400, and/or might take the form of source and/or installable code, which, upon compilation and/or installation on HMD device 1400 (e.g., using any of a variety of generally available compilers, installation programs, compression/decompression utilities, etc.), may take the form of executable code.

In some embodiments, memory 1420 may store a plurality of application modules 1422 through 1424, which may include any number of applications. Examples of applications may include gaming applications, conferencing applications, video playback applications, or other suitable applications. The applications may include a depth sensing function. Application modules 1422-1424 may include particular instructions to be executed by processor(s) 1410. In some embodiments, certain applications or parts of application modules 1422-1424 may be executable by other hardware modules 1480. In certain embodiments, memory 1420 may additionally include secure memory, which may include additional security controls to prevent copying or other unauthorized access to secure information.

In some embodiments, memory 1420 may include an operating system 1425 loaded therein. Operating system 1425 may be operable to initiate the execution of the instructions provided by application modules 1422-1424 and/or manage other hardware modules 1480 as well as interfaces with a wireless communication subsystem 1430 which may include one or more wireless transceivers. Operating system 1425 may be adapted to perform other operations across the components of HMD device 1400 including threading, resource management, data storage control and other similar functionality.

Wireless communication subsystem 1430 may include, for example, an infrared communication device, a wireless communication device and/or chipset (such as a Bluetooth® device, an 1402.11 device, a Wi-Fi device, a WiMax device, cellular communication facilities, etc.), and/or similar communication interfaces. HMD device 1400 may include one or more antennas 1434 for wireless communication as part of wireless communication subsystem 1430 or as a separate component coupled to any portion of the system. Depending on desired functionality, wireless communication subsystem 1430 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1430 may permit data to be exchanged with a network, other computer systems, and/or any other devices described herein. Wireless communication subsystem 1430 may include a means for transmitting or receiving data, such as identifiers of HMD devices, position data, a geographic map, a heat map, photos, or videos, using antenna(s) 1434 and wireless link(s) 1432. Wireless communication subsystem 1430, processor(s) 1410, and memory 1420 may together comprise at least a part of one or more of a means for performing some functions disclosed herein.

Embodiments of HMD device 1400 may also include one or more sensors 1490. Sensor(s) 1490 may include, for example, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1490 may include one or more inertial measurement units (IMUs) and/or one or more position sensors. An IMU may generate calibration data indicating an estimated position of HMD device 1400 relative to an initial position of HMD device 1400, based on measurement signals received from one or more of the position sensors. A position sensor may generate one or more measurement signals in response to motion of HMD device 1400. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensor may use a structured light pattern for sensing.

HMD device 1400 may include a single-panel display module 1460. Display module 1460 may be a near-eye display, and may graphically present information, such as images, videos, and various instructions, from HMD device 1400 to a user. Such information may be derived from one or more application modules 1422-1424, virtual reality engine 1426, one or more other hardware modules 1480, a combination thereof, or any other suitable means for resolving graphical content for the user (e.g., by operating system 1425). Display module 1460 may use liquid crystal display (LCD) technology, light-emitting diode (LED) technology (including, for example, OLED, ILED, mLED, AMOLED, TOLED, etc.), light emitting polymer display (LPD) technology, or some other display technology.

HMD device 1400 may include a user input/output module 1470. User input/output module 1470 may allow a user to send action requests to HMD device 1400. An action request may be a request to perform a particular action. For example, an action request may be to start or end an application or to perform a particular action within the application. User input/output module 1470 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to HMD device 1400. In some embodiments, user input/output module 1470 may provide haptic feedback to the user in accordance with instructions received from HMD device 1400. For example, the haptic feedback may be provided when an action request is received or has been performed.

HMD device 1400 may include a camera 1450 that may be used to take photos or videos of a user, for example, for tracking the user's eye position. Camera 1450 may also be used to take photos or videos of the environment, for example, for VR, AR, or MR applications. Camera 1450 may be used to implement camera 150 of FIG. 1. Camera 1450 may include, for example, a complementary metal-oxide-semiconductor (CMOS) image sensor with a few millions or tens of millions of pixels. In some implementations, camera 1450 may include two or more cameras that may be used to capture 3-D images.

In some embodiments, HMD device 1400 may include a plurality of other hardware modules 1480. Each of other hardware modules 1480 may be a physical module within HMD device 1400. While each of other hardware modules 1480 may be permanently configured as a structure, some of other hardware modules 1480 may be temporarily configured to perform specific functions or temporarily activated. Examples of other hardware modules 1480 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1480 may be implemented in software.

In some embodiments, memory 1420 of HMD device 1400 may also store a virtual reality engine 1426. Virtual reality engine 1426 may execute applications within HMD device 1400 and receive position information, acceleration information, velocity information, predicted future positions, or some combination thereof of HMD device 1400 from the various sensors. In some embodiments, the information received by virtual reality engine 1426 may be used for producing a signal (e.g., display instructions) to display module 1460. For example, if the received information indicates that the user has looked to the left, virtual reality engine 1426 may generate content for HMD device 1400 that mirrors the user's movement in a virtual environment. Additionally, virtual reality engine 1426 may perform an action within an application in response to an action request received from user input/output module 1470 and provide feedback to the user. The provided feedback may be visual, audible, or haptic feedback. In some implementations, processor(s) 1410 may include one or more GPUs that may execute virtual reality engine 1426.

In various implementations, the above-described hardware and modules may be implemented on a single device or on multiple devices that can communicate with one another using wired or wireless connections. For example, in some implementations, some components or modules, such as GPUs, virtual reality engine 1426, and applications (e.g., tracking application), may be implemented on a console separate from the head-mounted display device. In some implementations, one console may be connected to or support more than one HMD.

In alternative configurations, different and/or additional components may be included in HMD device 1400. Similarly, functionality of one or more of the components can be distributed among the components in a manner different from the manner described above. For example, in some embodiments, HMD device 1400 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method for generating a one-dimensional structured light pattern in a first direction and with a desired intensity pattern, the method comprising:
   generating, using a two-dimensional diffractive optical element with different periods in two orthogonal directions, a plurality of one-dimensional diffracted light patterns, wherein:
       each of the one-dimensional diffracted light patterns includes a one-dimensional diffracted light pattern in the first direction;
       the plurality of one-dimensional diffracted light patterns are distributed in a second direction different from the first direction; and
       each pair of adjacent one-dimensional diffracted light patterns of the plurality of one-dimensional diffracted light patterns at least partially overlaps in the second direction at a target plane; and
   combining the plurality of one-dimensional diffracted light patterns to form the one-dimensional structured light pattern with the desired intensity pattern.

2. The method of claim 1, wherein:
   a separation angle between each pair of adjacent one-dimensional diffracted light patterns of the plurality of one-dimensional diffracted light patterns in the second direction and with respect to the two-dimensional diffractive optical element is less than a threshold value.

3. The method of claim 2, wherein:
   the separation angle between each pair of adjacent one-dimensional diffracted light patterns of the plurality of one-dimensional diffracted light patterns in the second direction and with respect to the two-dimensional diffractive optical element is less than 0.5 degree.

4. The method of claim 2, wherein:
   the separation angle between each pair of adjacent one-dimensional diffracted light patterns of the plurality of one-dimensional diffracted light patterns in the second direction and with respect to the two-dimensional diffractive optical element is less than 0.2 degree.

5. The method of claim 1, wherein:
   a period of the two-dimensional diffractive optical element in the second direction is at least 40 times of a period of the two-dimensional diffractive optical element in the first direction.

6. The method of claim 1, wherein:
   a period of the two-dimensional diffractive optical element in the second direction is at least 100 times of a period of the two-dimensional diffractive optical element in the first direction.

7. The method of claim 1, wherein:
   the one-dimensional structured light pattern with the desired intensity pattern is a monochromatic light pattern.

8. The method of claim 1, wherein:
   an angle of view of the one-dimensional structured light pattern is greater than 100° in the first direction; and
   an angle of view of the one-dimensional structured light pattern is less than 5° in the second direction.

9. The method of claim 1, wherein:
   the desired intensity pattern is a non-uniform pattern.

10. The method of claim 1, wherein combining the plurality of one-dimensional diffracted light patterns to form the one-dimensional structured light pattern with the desired intensity pattern includes:
    combining the plurality of one-dimensional diffracted light patterns using an optical element configured to concentrate light in a direction perpendicular to each of the plurality of one-dimensional diffracted light patterns.

11. An optical device for generating a one-dimensional structured light pattern in a first direction and with a desired intensity pattern, the optical device comprising:
    a two-dimensional diffractive optical element configured to generate a plurality of one-dimensional diffracted light patterns, wherein:
        each of the one-dimensional diffracted light patterns includes a one-dimensional light pattern in the first direction;
        the plurality of one-dimensional diffracted light patterns are distributed in a second direction different from the first direction; and
        each pair of adjacent one-dimensional diffracted light patterns of the plurality of one-dimensional diffracted light patterns at least partially overlaps in the second direction at a target plane.

12. The optical device of claim 11, wherein:
    a separation angle between each pair of adjacent one-dimensional diffracted light patterns of the plurality of one-dimensional diffracted light patterns in the second direction and with respect to the two-dimensional diffractive optical element is less than a threshold value.

13. The optical device of claim 12, wherein:
    the separation angle between each pair of adjacent one-dimensional diffracted light patterns of the plurality of one-dimensional diffracted light patterns in the second direction and with respect to the two-dimensional diffractive optical element is less than 0.5 degree.

14. The optical device of claim 12, wherein:
    the separation angle between each pair of adjacent one-dimensional diffracted light patterns of the plurality of one-dimensional diffracted light patterns in the second direction and with respect to the two-dimensional diffractive optical element is less than 0.2 degree.

15. The optical device of claim 11, wherein:
a period of the two-dimensional diffractive optical element in the second direction is at least 40 times of a period of the two-dimensional diffractive optical element in the first direction.

16. The optical device of claim 11, wherein:
a period of the two-dimensional diffractive optical element in the second direction is at least 100 times of a period of the two-dimensional diffractive optical element in the first direction.

17. The optical device of claim 11, wherein:
the two-dimensional diffractive optical element has a multilevel or continuous phase profile in each period.

18. The optical device of claim 11, further comprising:
an optical element configured to concentrate light in a direction perpendicular to each of the plurality of one-dimensional diffracted light patterns.

19. An optical device for generating a one-dimensional structured light pattern in a first direction and with a desired intensity pattern, the optical device comprising: a two-dimensional diffractive optical element, wherein a period of the two-dimensional diffractive optical element in a second direction is configured such that each pair of adjacent diffraction spots at least partially overlap in the second direction at a target plane, and wherein a period of the two-dimensional diffractive optical element in the first direction is smaller than the period of the two-dimensional diffractive optical element in the second direction.

20. The optical device of claim 19, wherein:
a separation angle of diffraction spots in the second direction with respect to the optical device is less than 0.5 degree.

21. The optical device of claim 19, wherein:
a separation angle of the diffraction spots in the second direction with respect to the optical device is less than 0.2 degree.

22. The optical device of claim 19, wherein:
the period of the two-dimensional diffractive optical element in the second direction is at least 100 times of the period of the two-dimensional diffractive optical element in the first direction.

* * * * *

UNITED STATES PATENT AND TRADEMARK OFFICE
CERTIFICATE OF CORRECTION

PATENT NO. : 10,895,752 B1
APPLICATION NO. : 15/867463
DATED : January 19, 2021
INVENTOR(S) : Romano et al.

Page 1 of 1

It is certified that error appears in the above-identified patent and that said Letters Patent is hereby corrected as shown below:

On the Title Page

In Column 1, Inventors item (72), please add 4th Inventor:
--Yaniv Vinish, Carrigtwohill (IE)--

Signed and Sealed this
Thirteenth Day of September, 2022

Katherine Kelly Vidal
*Director of the United States Patent and Trademark Office*